(12) United States Patent
Aoki et al.

(10) Patent No.: US 11,361,547 B2
(45) Date of Patent: Jun. 14, 2022

(54) OBJECT DETECTION APPARATUS, PREDICTION MODEL GENERATION APPARATUS, OBJECT DETECTION METHOD, AND PROGRAM

(71) Applicant: NEC COMMUNICATION SYSTEMS, LTD., Tokyo (JP)

(72) Inventors: Noriyuki Aoki, Tokyo (JP); Masanori Takaoka, Tokyo (JP); Tetsuya Ito, Tokyo (JP); Hiroki Yokota, Tokyo (JP)

(73) Assignee: NEC COMMUNICATION SYSTEMS, LTD., Tokyo (JP)

( * ) Notice: Subject to any disclaimer, the term of this patent is extended or adjusted under 35 U.S.C. 154(b) by 60 days.

(21) Appl. No.: 16/770,170

(22) PCT Filed: Dec. 5, 2018

(86) PCT No.: PCT/JP2018/044800
§ 371 (c)(1),
(2) Date: Jun. 5, 2020

(87) PCT Pub. No.: WO2019/111976
PCT Pub. Date: Jun. 13, 2019

(65) Prior Publication Data
US 2020/0394415 A1    Dec. 17, 2020

(30) Foreign Application Priority Data

Dec. 8, 2017  (JP) .............................. JP2017-235838

(51) Int. Cl.
*G06K 9/00*    (2022.01)
*G06V 20/40*    (2022.01)
(Continued)

(52) U.S. Cl.
CPC .......... *G06V 20/46* (2022.01); *G06K 9/6256* (2013.01); *G06K 9/6261* (2013.01); *G06N 20/00* (2019.01);
(Continued)

(58) Field of Classification Search
None
See application file for complete search history.

(56) References Cited

U.S. PATENT DOCUMENTS 8,559,722 B2    10/2013  Tsuji
10,019,654 B1 *  7/2018  Pisoni .................... G06N 3/084
(Continued)

FOREIGN PATENT DOCUMENTS

JP    11-306325 A    11/1999
JP    2005-352718 A    12/2005
(Continued)

OTHER PUBLICATIONS

International Search Report of PCT/JP2018/044800 dated Jan. 29, 2019 [PCT/ISA/210].

*Primary Examiner* — Leon Viet Q Nguyen
(74) *Attorney, Agent, or Firm* — Sughrue Mion, PLLC

(57) ABSTRACT

An object detection apparatus comprising: an input part configured to input video data, an extraction part configured to extract image data from the video data, and a determination part configured to determine whether or not the image data includes an object, wherein the determination part is configured to: set a plurality of regions in a learning image data such that the object appearing in the learning image data extracted from a learning video data captured in advance extends over at least the plurality of regions, assign a learning teach label to each of the regions set, and determine whether or not the image data includes the object by using
(Continued)

a prediction model generated by utilizing the learning teach label assigned to each of the regions set.

7 Claims, 9 Drawing Sheets

(51) Int. Cl.
  *G06T 7/70* (2017.01)
  *G06N 20/00* (2019.01)
  *G06K 9/62* (2022.01)
  *G06T 7/00* (2017.01)
  *G06V 10/98* (2022.01)

(52) U.S. Cl.
  CPC .............. *G06T 7/0002* (2013.01); *G06T 7/70* (2017.01); *G06V 10/98* (2022.01); *G06T 2207/10016* (2013.01); *G06T 2207/10032* (2013.01); *G06T 2207/20081* (2013.01)

(56) References Cited

U.S. PATENT DOCUMENTS

| | | | |
|---|---|---|---|
| 10,319,097 | B2 | 6/2019 | Kuroda et al. |
| 10,438,050 | B2 * | 10/2019 | Watanabe ............... G06T 7/248 |
| 2011/0194732 | A1 | 8/2011 | Tsuji |
| 2017/0116749 | A1 | 4/2017 | Kuroda et al. |
| 2018/0121762 | A1 * | 5/2018 | Han ..................... G06K 9/4671 |

FOREIGN PATENT DOCUMENTS

| | | |
|---|---|---|
| JP | 2007-272421 A | 10/2007 |
| JP | 2011-165008 A | 8/2011 |
| JP | 2012-088787 A | 5/2012 |
| JP | 2014-016710 A | 1/2014 |
| JP | 2016-062524 A | 4/2016 |
| JP | 2017-085564 A | 5/2017 |

* cited by examiner

OBJECT DETECTION APPARATUS, PREDICTION MODEL GENERATION APPARATUS, OBJECT DETECTION METHOD, AND PROGRAM

CROSS REFERENCE TO RELATED APPLICATIONS

This application is a National Stage of International Application No. PCT/JP2018/044800, filed Dec. 5, 2018, claiming priority to Japanese Patent Application No. 2017-235838, filed Dec. 8, 2017, the contents of all of which are incorporated herein by reference in their entirety.

FIELD

The present invention relates to an object detection apparatus, a prediction model generation apparatus, an object detection method, and a program.

BACKGROUND ART

It becomes a common practice to mount a camera on an unmanned flying body called a vehicle or a drone (hereinafter, these are collectively referred to as "mobile body"), and to inspect a facility(es) or an equipment and the like from captured image of the camera. In particular, in inspection of the facilities and the equipment whose positions and the like are known (hereinafter, these are collectively referred to as "object"), the mobile body is moved along a predetermined route, and video image is taken by the camera mounted on the mobile body. By adopting such a scheme, it becomes possible for an inspector(s) to check the presence or absence of an abnormality of the objects by watching the video image without going to a physical site(s).

Patent Literature 1 discloses an image recognition apparatus that can determine that an object detected from image data is the object not registered in a database more accurately. According to the literature, the image recognition apparatus has a database in which the image data of the objects captured, or an image feature(s) and a shooting state(s) of the object detected from the image data are registered as registered image information in association with the object. Then, the image recognition apparatus detects specific object image from the image data to be processed. The image recognition apparatus calculates the degree of coincidence of the shooting states of the object and the degree of similarity of the image features of the object between the object image and the registered image, and recognizes whether or not the object in the object image is the object of the registered image, based on the degree of coincidence and the degree of similarity. Then, in a case where the degree of similarity is lower than a first threshold value and the degree of coincidence is equal to or larger than a second threshold value, the image recognition apparatus recognizes that the object in the object image is different from the object in the registered image data information.

Patent Literature 2 discloses an object detection apparatus comprising an image extraction means that extracts an image of each predetermined region from input image, a brightness correction means, and an object detection means. Concretely, the brightness correction means, in a case where a brightness value(s) of a pixel(s) constituting the image of the predetermined region that is extracted by the image extraction means exceeds a predetermined threshold value, the brightness correction means corrects the brightness value(s) of the pixel(s) so as not to exceed the predetermined threshold value. Then, it is described that the object detection means detects the object based on the image of the predetermined region including the pixels whose brightness values have been corrected by the brightness correction means, and a learning model for detecting the object.

Other than above, Patent Literature 3 discloses an image processing apparatus that tracks an object in a frame image forming a video image. Also, Patent Literature 4 discloses a technique for assigning an index to the video image to select a representative image.

[PTL 1] Japanese Patent Publication No. 2011-165008A
[PTL 2] Japanese Patent Publication No. 2007-272421A
[PTL 3] Japanese Patent Publication No. 2017-085564A
[PTL 3] Japanese Patent Publication No. 2005-352718A

SUMMARY

Following analysis is provided by the present invention. In the above mentioned scheme, in which an inspector(s) watch the video image and check whether there is any abnormality in the object(s), the inspector(s) need to watch the video (movie) image taken from the beginning to the end and search for the object(s), which results in a problem of taking long time. Furthermore, depending on the skill of the inspector(s), the object(s) to be inspected may be missed.

It is an object of the present invention to provide an object detection apparatus, a prediction model generation apparatus, an object detection method and a program that contribute to reduce burden on the inspector(s) who inspects the object(s) by watching the video image.

According to a first aspect, there is provided an object detection apparatus. The object detection apparatus, comprising: an input part configured to input video data, an extraction part configured to extract image data from the video data, and a determination part configured to determine whether or not the image data includes an object, wherein the determination part is configured to: set a plurality of regions in a learning image data such that the object appearing in the learning image data extracted from a learning video data captured in advance extends over at least the plurality of regions, assign a learning teach label to each of the regions set, and determine whether or not the image data includes the object by using a prediction model generated by utilizing the learning teach label assigned to each of the regions set.

According to a second aspect, there is provided a prediction model generation apparatus. The prediction model generation apparatus, comprising: an input part configured to input learning video data captured in advance, an extraction part configured to extract learning image data from the learning video data, and a learning engine configured to generate a prediction model by setting a plurality of regions in the learning image data such that an object appearing in the learning image data extracted from the learning video data extends over at least the plurality of regions, and by assigning a learning teach label to each of the regions set.

According to a third aspect, there is provided an object detection method. The object detection method from video data performed by a computer comprising an input part configured to input the video data, the computer comprising: extracting of image data from the video data, and determining whether or not the image data includes an object by setting a plurality of regions in the learning image data such that the object appearing in the learning image data extracted from learning video data captured in advance extends over at least the plurality of regions, and by assigning a learning teach label to each of the regions set.

According to a fourth aspect, there is provided a program executed by a computer comprising an input part configured to input video data, comprising: a process of extraction of image data from the video data, and a process of determination whether or not the image data includes an object by setting a plurality of regions in the learning image data such that the object appearing in the learning image data extracted from learning video data captured in advance extends over at least the plurality of regions, and by assigning a learning teach label to each of the regions set.

The program can be recorded on a computer-readable storage medium. The storage medium can be set to a non-transient (non-transient) one such as a semiconductor memory, a hard disk, a magnetic recording medium, or an optical recording medium. The present invention can also be embodied as a computer program product.

According to the present invention, it becomes possible to reduce the burden of inspectors in charge who check the objects etc. by watching the video image. That is, the present invention converts the object detection apparatus described in the background art into an apparatus that can dramatically reduce the burden on the inspector(s).

MODES

Figure 1:
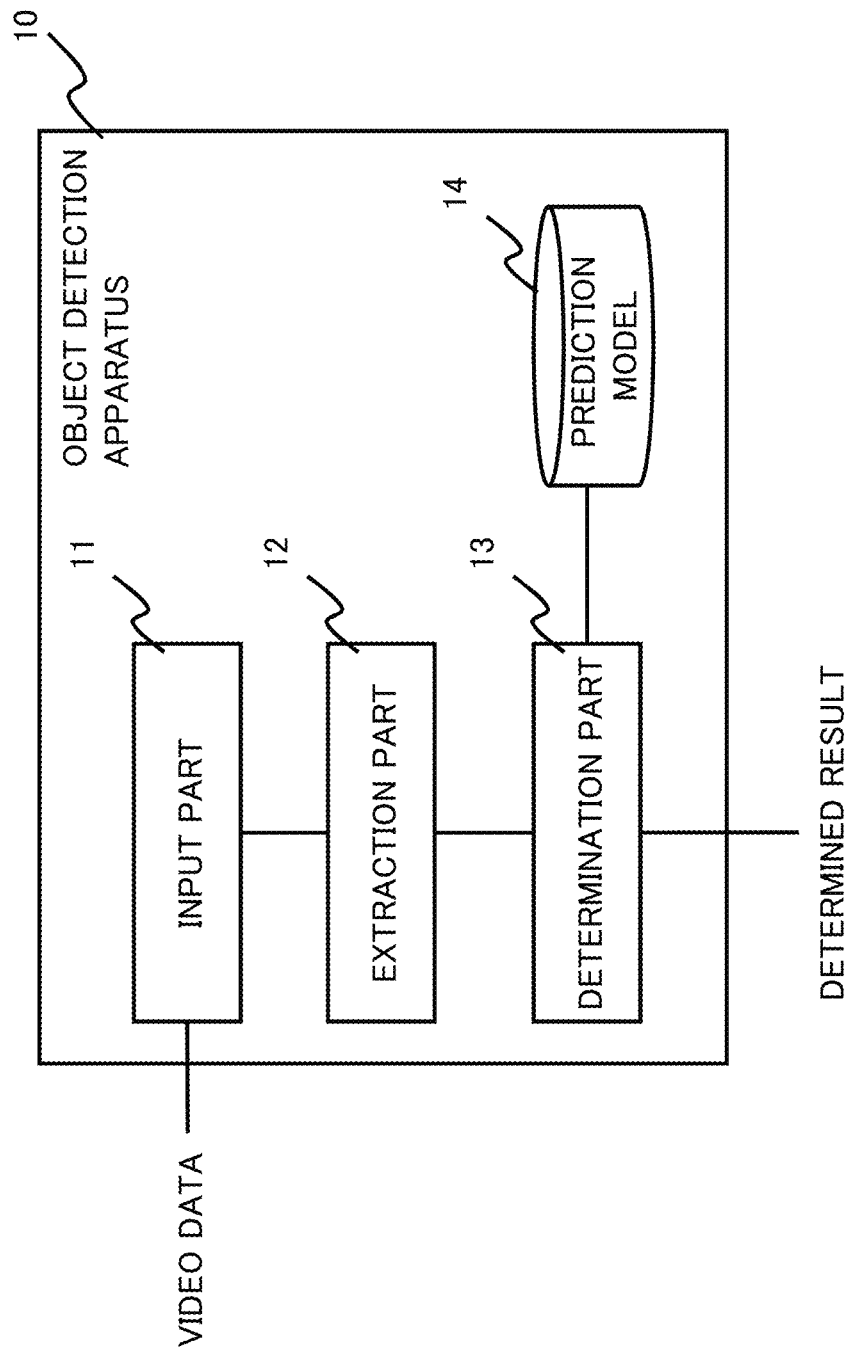
FIG. 1 is a diagram showing a configuration of one example embodiment of the present invention.

First, an outline of one exemplary embodiment will be described by referring to the drawings. The reference symbols of the drawings appended to this outline are added for the sake of convenience to each element as an example for aiding understanding, and the description of the outline is not intended to limit any way. Also, a connection line between blocks in each block diagram includes both bidirectional and unidirectional directions. The unidirectional arrows schematically indicate the flow of main signals (data), and do not exclude bidirectionality. Also, at the connecting points showing input and output of each blocks in the drawings, there are port and/or interface which are omitted in the drawings.

In one exemplary embodiment, the present invention can be realized by an object detection apparatus 10 comprising an input part 11, an extraction part 12, and a determination part 13, as shown in FIG. 1. More concretely, the input part 11 inputs video data. The extraction part 12 extracts still image data from the video data. The determination part 13 determines whether or not an object is appearing in the still image data based on a predetermined prediction model 14.

The predetermined prediction model 14 is generated as follows. First, learning still image data is extracted from learning video data captured in advance. Then, a plurality of regions is set in the learning still image data such that the object appearing in the learning still image data extends over at least the plurality of regions (refer to FL1-1 to FL1-6 in FIG. 6 and FIG. 7). Then, a learning teach label is assigned to each of the regions set. Further, a large number of pairs of the regions and the learning teach labels are input to a predetermined machine learning engine, and the prediction model is generated.

Then, by using the prediction model, the determination part 13 determines whether or not the object is included in the still image data extracted from the video data input.

With the above mentioned configuration, it becomes possible to reduce the burden on an inspector(s) in charge of inspecting the objects by watching the video data. The reason is that by setting a plurality of regions in the still image data such that the object appearing in the still image data extends over at least the plurality of regions, a detection capability of the object appearing in the still image data is improved.

First Exemplary Embodiment

Next, a first exemplary embodiment of the present invention will be described in detail with reference to the drawings. Hereinafter, in the first exemplary embodiment, an example will be described in which an inspection object on a traveling route is inspected using video data obtained by photographing a scene(s) in front of a vehicle with a camera mounted on the vehicle. In addition, the inspection object(s) will be described as a utility pole(s) installed along a main road.

Figure 2:
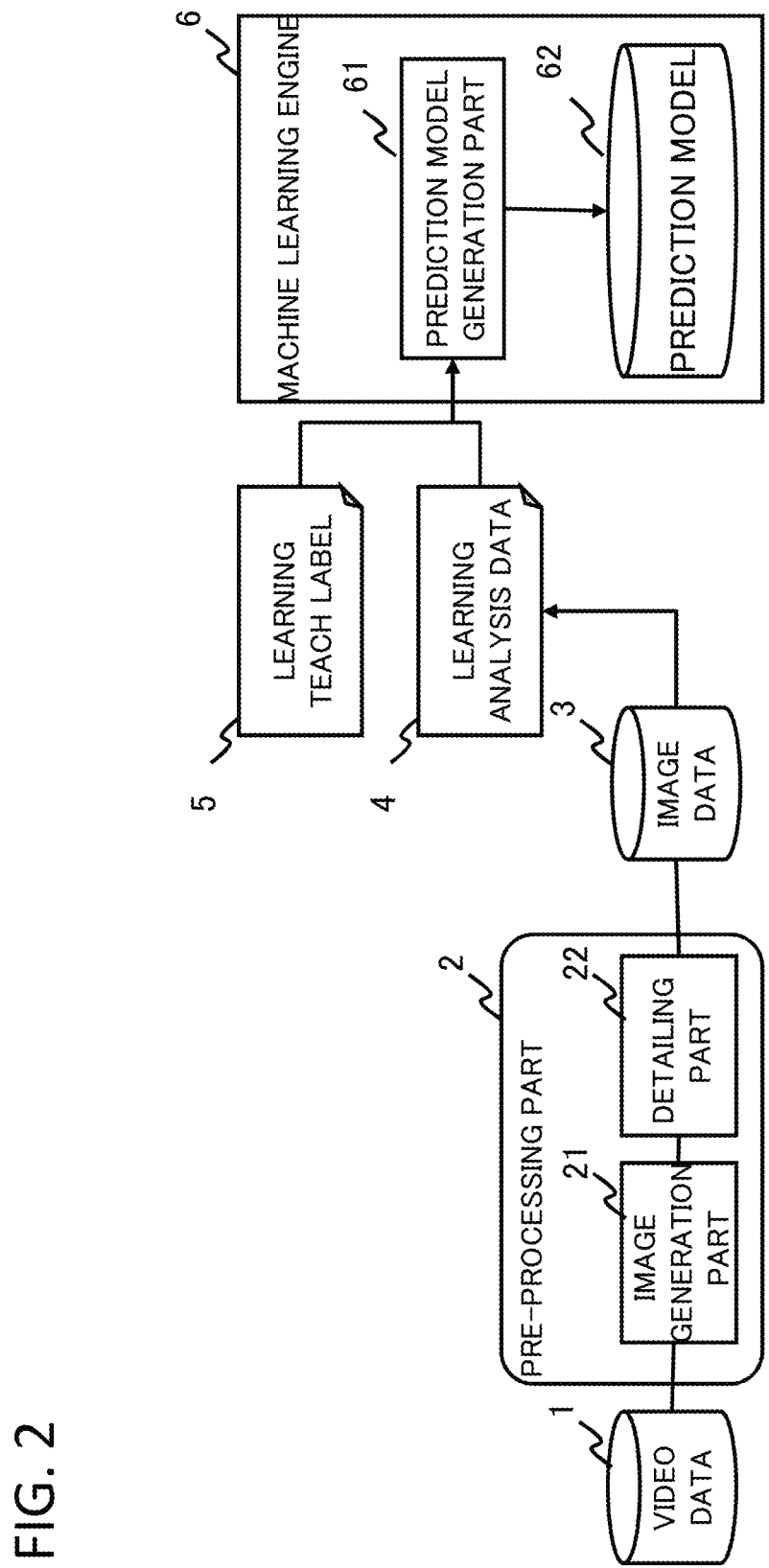
FIG. 2 is a functional block diagram showing a configuration of a prediction model generation apparatus by a first exemplary embodiment of the present invention.

FIG. 2 is a functional block diagram showing a configuration of a prediction model generation apparatus according to the first exemplary embodiment of the present invention. By referring to FIG. 2, the configuration is provided by a pre-processing part 2 that converts the video data 1 into image data (still image data) 3, and a machine learning engine 6 that generates a prediction model 62 using learning analysis data 4 and a learning teach label 5 assigned to the learning analysis data 4.

The pre-processing part 2 comprises an image generation part 21 and a detailing part 22. The image generation part 21 performs a process of cutting out image (frame: still image data, hereinafter referred to as "image") from the video data at a predetermined sampling cycle. The detailing part 22 performs image detailing process as needed. As the detailing process, for example, image quality improvement techniques such as contour correction and dot noise elimination can be used. Alternatively, by reversing the order of the detailing part 22 and the image generation part 21, the image generation part 21 may cut out the image after referring to pixel information of the frames before and after quality improvement of the certain frame. The image data generated by the pre-processing part 2 becomes material of the learning analysis data 4.

The machine learning engine (machine learning part) 6 comprises a prediction model generation part 61 that performs a learning phase of machine learning. The prediction model generation part 61 generates the prediction model 62 that determines whether or not the inspection object is appearing in any image data, using the learning analysis data 4 to which the learning teach label 5 is assigned. Details of the processing of the pre-processing part 2 and the machine learning engine 6 will be described later in detail.

Here, the pre-processing part 2 and the machine learning engine 6 can be realized on a computer using a computer program for realizing a function(s) of these elements described later. Alternatively, as the pre-processing part 2 and the machine learning engine 6, those provided as a cloud service may be used.

Figure 3:
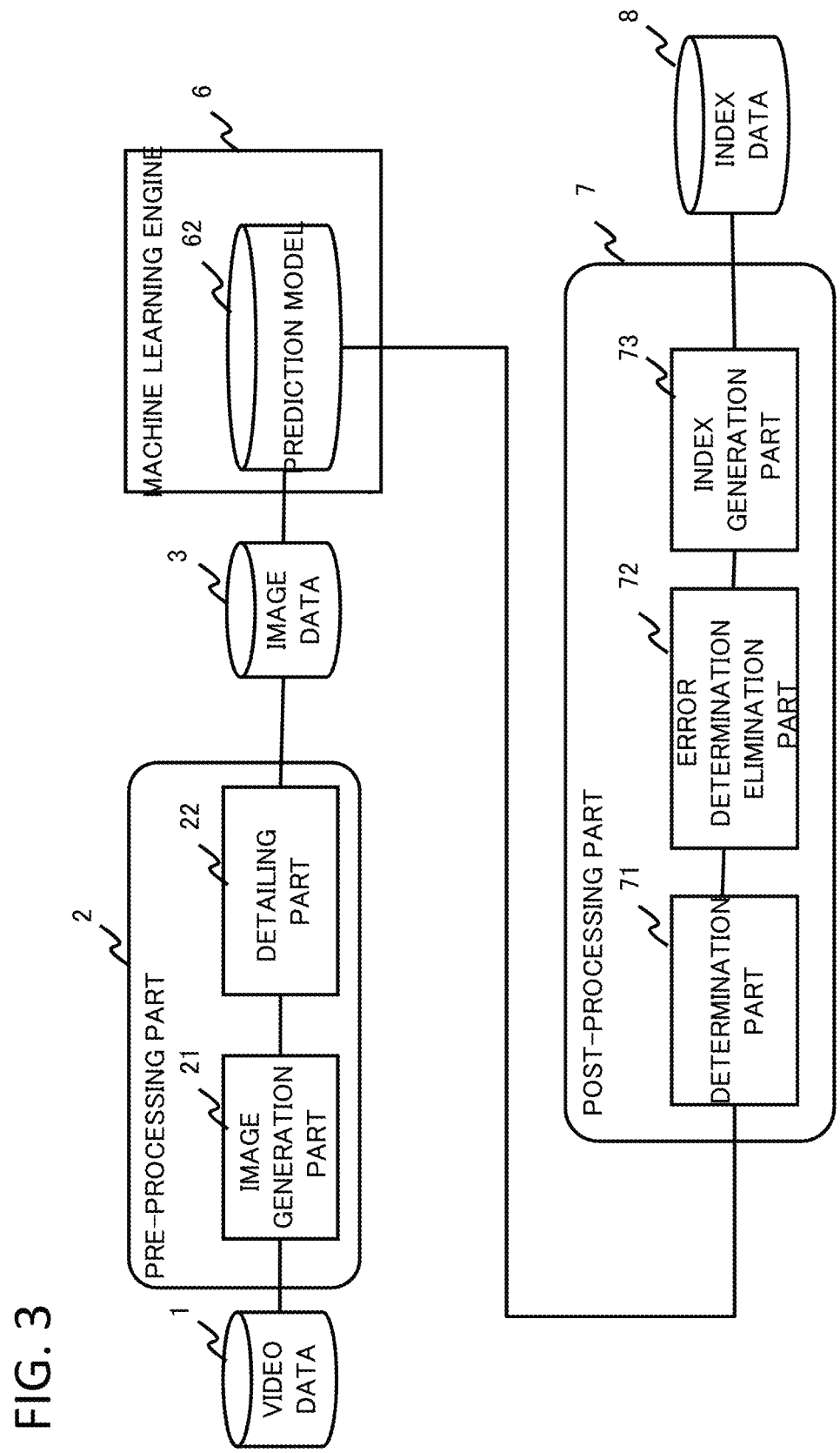
FIG. 3 is a functional block diagram showing a configuration of an index generation apparatus by the first exemplary embodiment of the present invention.

FIG. 3 is a functional block diagram showing a configuration of the index generation apparatus according to the first exemplary embodiment of the present invention. By referring to FIG. 3, it comprises the pre-processing part 2 that converts the video data 1 into the image data 3, the machine learning engine 6, and the post-processing part 7 that outputs the index data corresponding to the video data based on an output of the machine learning engine 6.

As the pre-processing part 2, the same one as the pre-processing part 2 according to the prediction model generation apparatus shown in FIG. 2 can be used.

The machine learning engine 6 determines whether or not the inspection object is appearing in the image data by using the prediction model 62 (detection phase (operation phase)). In the present exemplary embodiment, the machine learning engine 6 outputs a value called a certainty factor (likelihood) indicating whether or not the inspection object is appearing in the image data.

The post-processing part 7 comprises a determination processing part 71, an error determination elimination part 72, and an index generation part 73. The determination processing part 71 compares a determination result by the machine learning engine 6 with a predetermined determination threshold value, and determines whether or not the inspection object is appearing in the image data. The error determination elimination part 72 inspects a result determined by the determination processing part 71 and eliminates (removes) the error determination (result). The index generation part 73 generates index data 8 indicating a timing at which the inspection object is appearing in the video data, a position in the image, and the like, based on a correspondence between the determination result after the error determination elimination process and the image data. Details of the processing of the post-processing part 7 will be described later.

The image generation part 21 of the preprocessing part 2 in FIG. 3 corresponds to the extraction part 12 in FIG. 1. Also, the machine learning engine 6 in FIG. 3 and the determination processing part 71 of the post-processing part 7 correspond to the determination part 13 in FIG. 1.

Figure 4:
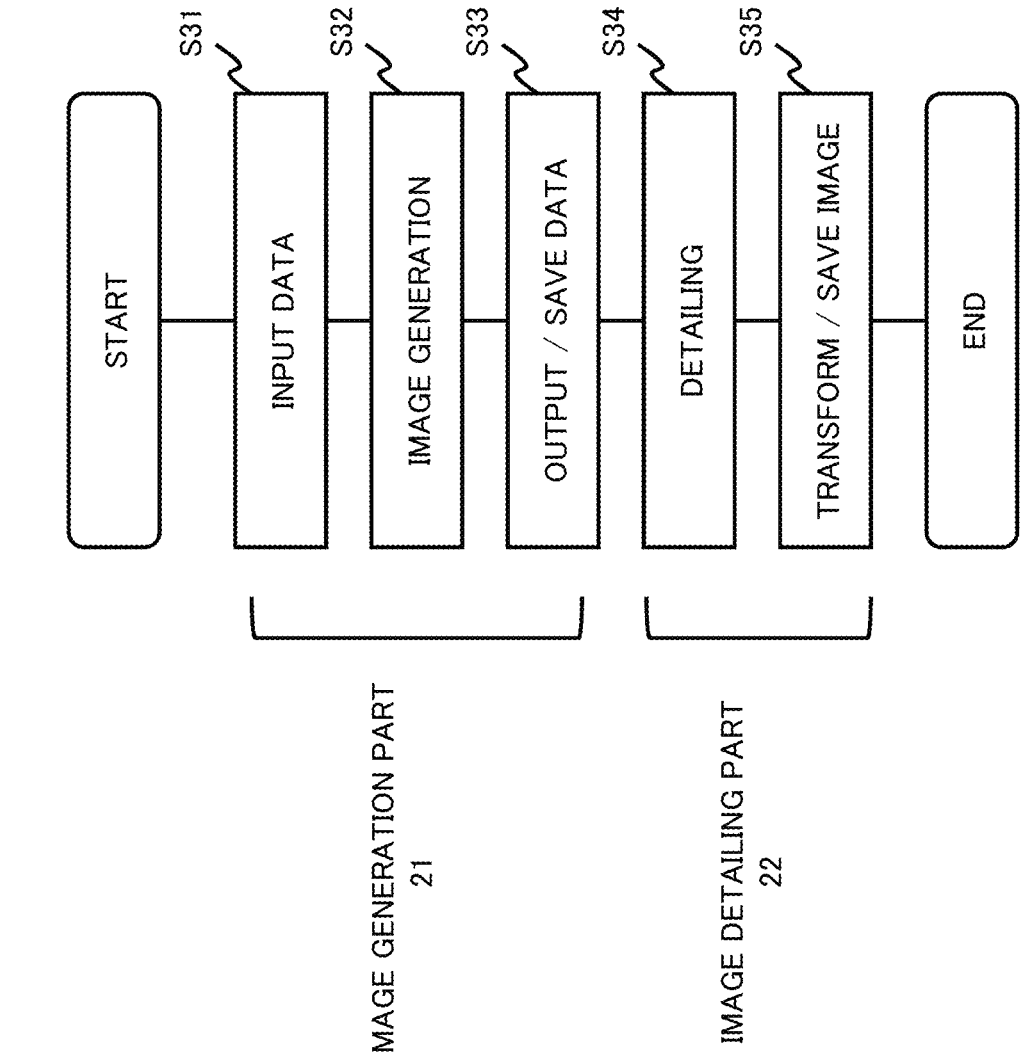
FIG. 4 is a diagram showing a processing flow executed as pre-processing of the first exemplary embodiment of the present invention.

Next, an operation of the first exemplary embodiment of the present invention will be described in detail with reference to the drawings. First, the pre-processing performed by the pre-processing part 2 will be described. FIG. 4 is a diagram showing a processing flow performed by the pre-processing part according to the first exemplary embodiment of the present invention. By referring to FIG. 4, first, when data is input (Step S31), the image generation part 21 of the pre-processing part 2 cuts out the image data from the video data in a predetermined sampling cycle (Step S32; image generation).

The image generation part 21 stores the cut-out image data in a predetermined storage device (Step S33). Next, the detailing part 22 performs the detailing process on the extracted image data as needed (Step S34). The detailing part 22 stores the image data after the detailing process in the predetermined storage device (step S35).

Thus, applying pre-processing by the pre-processing part 2 is completed. Next, a process of the prediction model generation by the machine learning engine 6 will be described.

Figure 5:
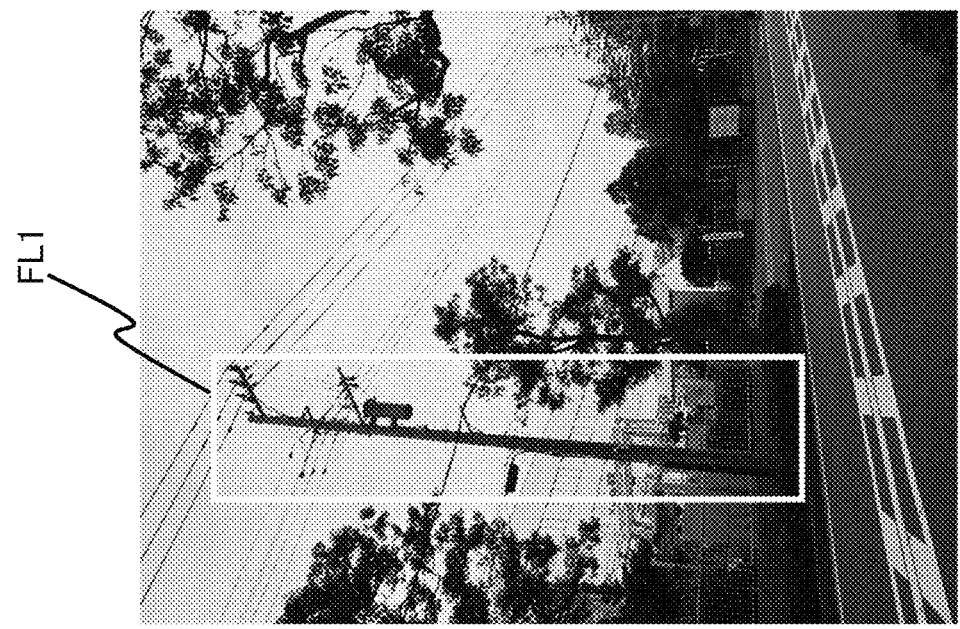
FIG. 5 is a diagram explaining an object in an image cut out from video image.

FIG. 5 shows an example of the image data cut out from the video data 1. In FIG. 5, the utility pole surrounded by a white frame line(s) FL1 is the inspection object. In a case of specific object detection, machine learning may be performed by preparing a large number of photographs of the entire utility pole, however, in the present invention, machine learning is performed by dividing the utility pole so as to extend over a plurality of regions as described below.

In the present exemplary embodiment, the plurality of regions is set for one image so that the utility pole as the inspection object extends over at least the plurality of regions, and the learning teach label 5 is assigned to each region. As a method of assigning the learning teach label 5 to the learning analysis data 4, a method called a marking label for marking a partial area in the image and performing labeling (assigning correct answer value) can be used.

Figure 6:
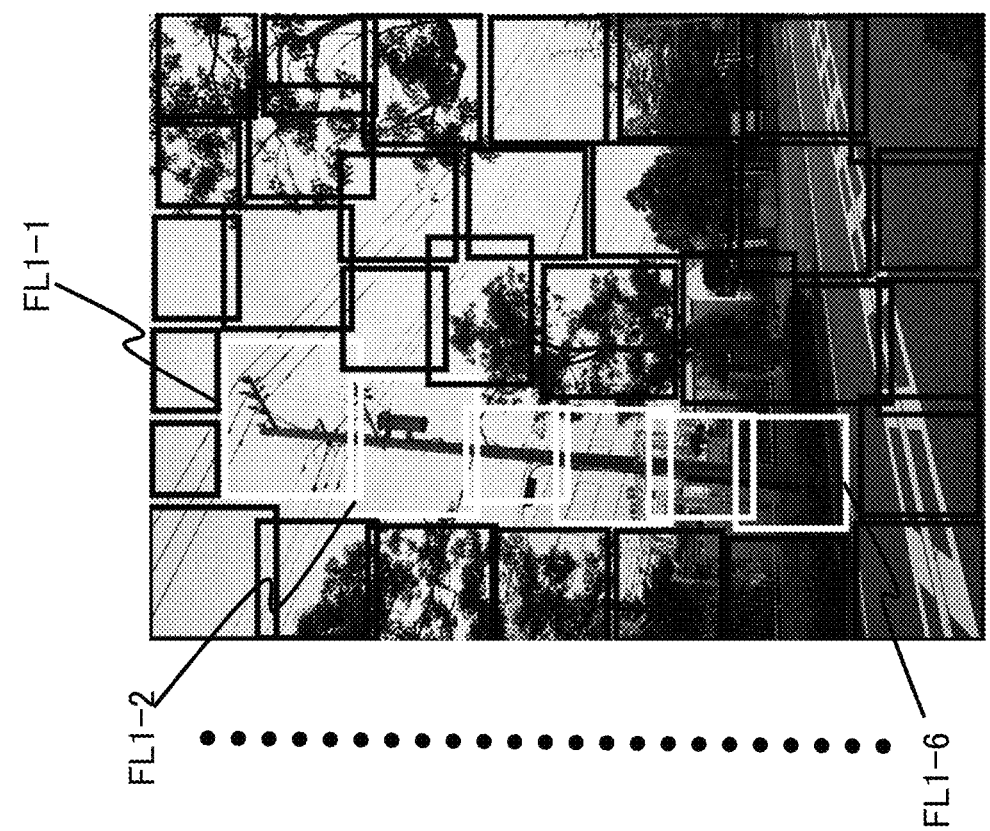
FIG. 6 is a diagram showing a method for generating a prediction model in the first exemplary embodiment of the present invention.

FIG. 6 is a diagram explaining a method (scheme) for generating the prediction model according to the first exemplary embodiment of the present invention. In the example of FIG. 6, the utility pole to be inspected is subdivided and marked by the white frame lines FL1-1 to FL1-6. In the example of FIG. 6, the other parts are similarly subdivided and marked with a black frame line(s). Here, in the example shown in FIG. 6, the region designated by the marking label can be freely set to any size. Further, there are no problem even if the respective regions overlap as in the example of FIG. 6.

Figure 7:
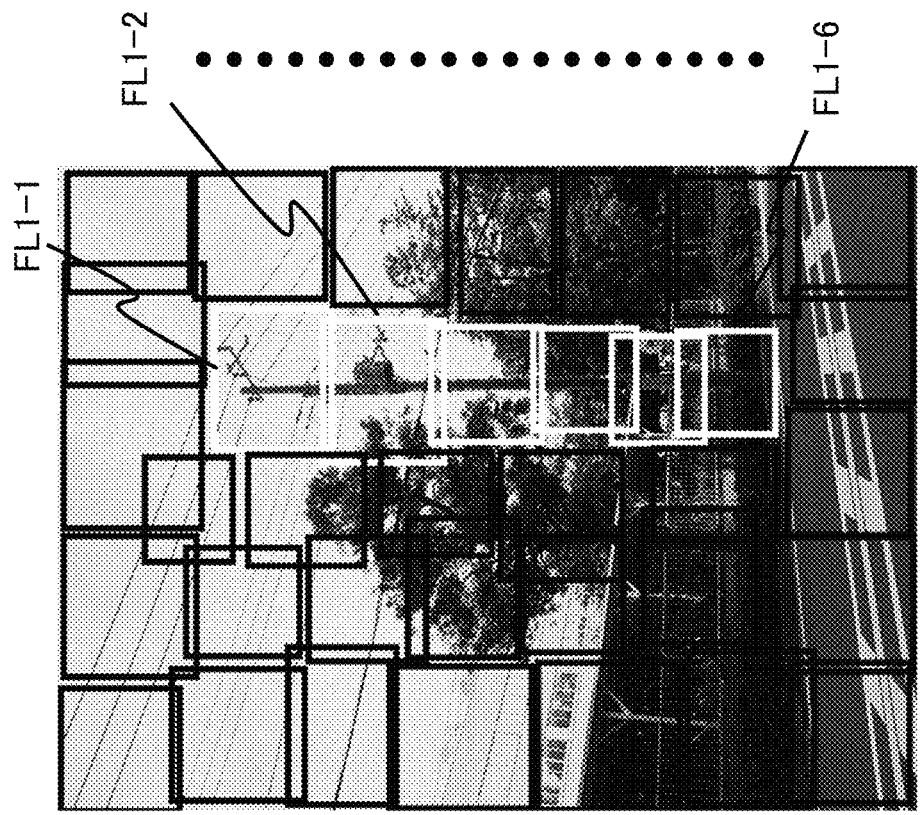
FIG. 7 is another diagram showing the method for generating a prediction model in the first exemplary embodiment of the present invention.

FIG. 7 shows an example in which the white frames FL1-1 to FL1-6 and the black frames are set in the image cut-out from the video data at a timing different from that in FIG. 6. As described above, in a case where the object appearing in the learning still image data has a height or a width, it is possible to adopt the method to generate the prediction model by setting N regions in a longitudinal direction, and by assigning the learning teach label to each of N regions to generate the prediction model. It is evident by comparing between FIG. 6 and FIG. 7, that the number and arrangement of the frame lines may be changed for each image data. Also, the number and arrangement of the frame lines may be determined by a computer according to a predetermined rule(s), or may be set by the inspector(s) who is experienced in the computer. It is needless to note that, it is also possible to set mechanically a grid(s) in a grid pattern(s) and assign the learning teach labels to each of these grids.

Each of the marked regions shown in FIG. 6 and FIG. 7 becomes the learning analysis data 4, and the learning teach label 5 is assigned to each of them. At that time, it is more preferred that the machine learning engine 6 increases the number of learning image by performing image processings such as sliding window scheme, inversion, rotation, and brightness conversion on the learning analysis data 4. By learning these data set, the machine learning engine 6 can learn a feature(s) of the inspection object to be detected without omission. Further, in the present exemplary embodiment, as described above, since learning is performed by dividing into the plurality of regions, the prediction model can detect the inspection objects which is partly hidden or has a similarity thereto. This point is a great advantage over the method of learning in a whole view (entire view) for the inspection object indicated by the frame lines FL1 in FIG. 5.

Next, an operation of the index generation apparatus that generates the index data using the prediction model 62 generated as described above will be described. The index generation apparatus performs applying pre-processing in the same manner as the applying pre-processing of the prediction model generation apparatus when the video data is input as shown in FIG. 4. Next, the index generation apparatus inputs the pre-processed image data to the machine learning engine 6, and obtains the degree of certainty (likelihood) that the inspection object is appearing in the image data.

Figure 8:
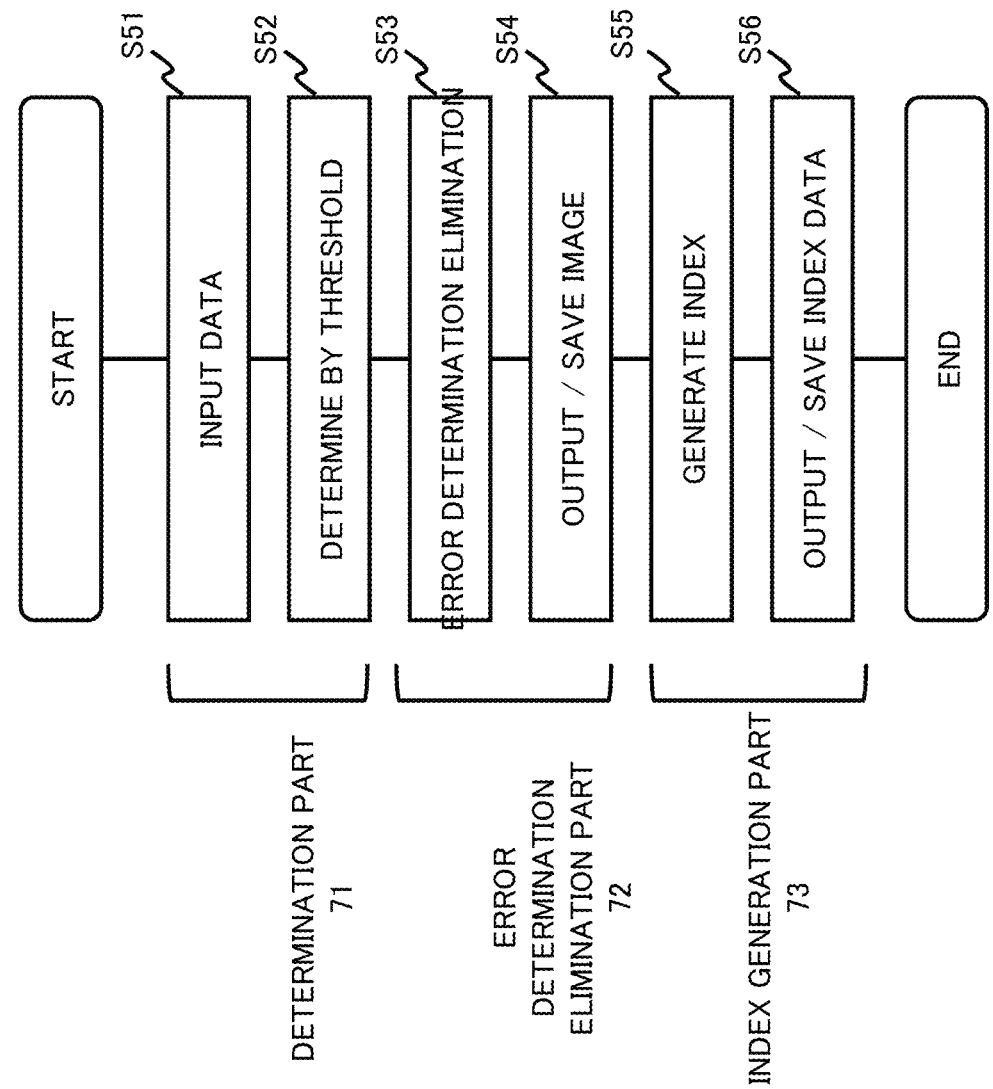
FIG. 8 is a diagram showing a processing flow executed by a post-processing part according to the first exemplary embodiment of the present invention.

Next, the index generation apparatus inputs a determination result of the machine learning engine 6 to the post-processing part 7 and performs processing up to the index generation. FIG. 8 is a diagram showing a processing flow performed by the post-processing part 7 according to the first exemplary embodiment in the present invention. After a determination result of the machine learning engine 6 is input (Step S51), the determination processing part 71 of the index generation apparatus performs a threshold value determination (Step S52). The threshold value determination is performed by comparing the certainty (likelihood) value that the inspection object is appearing in the image data by the output from the machine learning engine 6 with a predetermined determination threshold value to determine whether or not the inspection object is appearing in the image data. For example, in a case that the determination threshold value is 85%, image having the certainty (likelihood) output by the machine learning engine 6 of 85% or more is determined to be the inspection object "appearing". Note that the determination threshold value can be tuned according to the determination object, the situation to be determined, the target use of the index data, and the like.

Next, the index generation apparatus performs an error determination elimination process that eliminates (removes) from the results of the threshold determination, those that are considered to be erroneously determined (Step S53). For example, in a case where the inspection object is the utility pole, there are cases that an object reflected in the image which has a vertically long shape, or resembles the shape of the utility pole while it is not a utility pole (for example, a support pole for a streetlight, a pipe in a building, etc.), and the object is erroneously determined as the utility pole. In particular, in the present exemplary embodiment, since detection capability of the determination processing part 71 is improved, the probability of an erroneous determination will increase.

Therefore, in the present exemplary embodiment, the error determination process is inserted to eliminate those that are considered to have been erroneously determined. As the error determination process, for example, a method of detecting an error determination based on a rule(s) that the inspection object appears in the video data can be used as follows. For example, the utility poles are arranged at a certain interval, and a distance (interval) is within a certain range. Also, since the video data is taken while running on a road, a time at which the video data is taken and a speed at which running is made that time can be recorded. By using these times and speeds, it becomes possible to derive an appropriate time interval for detecting the next utility pole from certain one utility pole. In a case where it is determined that any utility pole is appearing during this time interval, it can be determined that this utility pole is erroneous. The error determination elimination part 72 performs a process of eliminating the image data that has been erroneously determined as described above. The error determination process is not limited to the above example, and a method of detecting error determination using, for example, a feature(s) of the specific regional image of utility pole (presence or absence of a sign board, background of a utility pole) and the like can also be adopted.

Next, the index generation apparatus outputs (stores) the image data from which the error determination elimination has been completed (Step S54). Note that, as for those cases that cannot be eliminated as error determinations by the error determination elimination process, the accuracy of the prediction model detection can be improved by separately re-learning the result of the error determination in machine learning. For example, at the time of determination whether or not the inspection object has been detected, marking is given as to what part(s) in the region(s) in the image is detected as a utility pole, followed by outputting. The prediction model can be improved by adding this to the learning analysis data, assigning the correct learning teach label, and performing re-learning.

Next, the index generation apparatus inputs an output information of the error determination elimination part 72 to the index generation part 73 to generate the index (Step S55). The index generation part 73 outputs the index generated as the index data 8 and stores it in the predetermined storage device (Step S56). More concretely, the index generation part 73 generates the index data including time information of scenes in which the utility pole is appearing in the video data, and the image data, based on the image of the utility pole to be inspected and the position information and the like. The image data may include a marking indicating which part in the image has been detected as the utility pole in a case that the presence or absence of the inspection object was determined. This allows the inspector (s) to easily confirm in which part of the scene(s) in the video data the inspection object appears.

As described above, according to the present exemplary embodiment, following effects can be obtained. A first effect is that it is possible to identify only a portion to be referred to in which the inspection object is captured with high accuracy without missing from among the video data. As a result, the operation of confirming the captured video data of a long time can be reduced.

A second effect is that the inspection object can be detected with relatively little learning data. The reason is that the machine learning method is devised so as to adopt the configuration that effectively utilizes the marking label. It is also preferred to increase the number of the learning image by using image processings such as sliding window scheme, inversion, rotation, and brightness conversion. By using these schemes, it becomes possible to prevent the inspection object from being overlooked even with a small amount of the learning data. Besides, it is possible to detect an object that is partially hidden (occlusion). Also, depending on setting of the regions and tuning of the determination the threshold value, a similar unlearned object(s) can be detected (generalization ability).

A third effect is that, as a result of the determination by the prediction model, which part in the image has been identified as the inspection target can be marked and output. As a result, the operation of confirming the long-time recorded video data can be facilitated, and can be used for re-learning as necessary.

A fourth effect is that the determination scheme (reference standard, threshold, error) can be tuned according to the object to be detected, the quality of video data, the purpose of use of object detection, and the like. For example, it is possible to tune the determination scheme according to the features such as the certainty (likelihood) of the determination result by the prediction model and the appearance frequency of the target (the ratio of the screen on which the target appears). Thereby, it becomes possible to perform tuning in accordance with the video data and the target object to be detected, and to improve the detection accuracy.

Each exemplary embodiment of the present invention has been described as above, however, the present invention is not limited to the above-described exemplary embodiments, and further modifications, substitutions, and adjustments may be made without departing from the basic technical idea of the present invention can be added. For example, the network configuration, the configuration of each element, and the expression form of the message shown in each drawing are an example(s) for helping the understanding of the present invention, and are not limited to the configurations shown in these drawings. In addition, in the following description, "A and/or B" is used to mean at least one of A and B.

For example, in the above-described exemplary embodiment, description has been made assuming that the detailing process is performed in each of the generation of the prediction model (FIG. 2) and the generation of the index data (FIG. 3), however, the detailing process may be omitted. Alternatively, for example, in the pre-processing, generation of the prediction model (FIG. 2) and generation of the index data (FIG. 3) may be performed using the image data of which image quality has been reduced after image generation.

Alternatively, in the above-described exemplary embodiment, the object detection apparatus 10, the prediction model generation apparatus, and the index generation apparatus have been described separately, however, the respective apparatuses can be integrated or further subdivided. For example, since the pre-processing part 2 and the machine learning engine 6 are common to the prediction model generation apparatus and the index generation apparatus, they may be realized on the same apparatus. Further, the pre-processing part 2, the machine learning engine 6, and the post-processing part 7 of the index generation apparatus may be realized on different hardware. For example, a configuration in which the pre-processing part 2 and the machine learning engine 6 use a network function on cloud base, and the post-processing part 7 is realized in a mobile terminal such as a smartphone by way of an application program can be adopted.

Also, in the above-described exemplary embodiment, an example in which the detection target is the utility pole has been described, however, the present invention can be applied to other than the utility pole, for example, an electric power pole built along a railway line. Also, the detection target is not limited to one type, and may be a plurality of types. Also, in the above-described exemplary embodiment, the description has been made assuming that the video data taken from a vehicle is used, however, various facilities and equipment using the video data photographed by a camera mounted on the moving body such as a drone or a train can also be applied as an inspection applications.

It is also preferred to mount a GPS (Global Positioning System) receiver or the like as the position information acquisition part on these moving bodies. The index generation part 73 can generate the index data including not only the appearance time of the inspection target object but also the appearance position (imaging position). Thereby, the position of the inspection object can be easily specified, and an appropriate dispatch instruction can be issued to a worker (s) when the abnormality is found.

Figure 9:
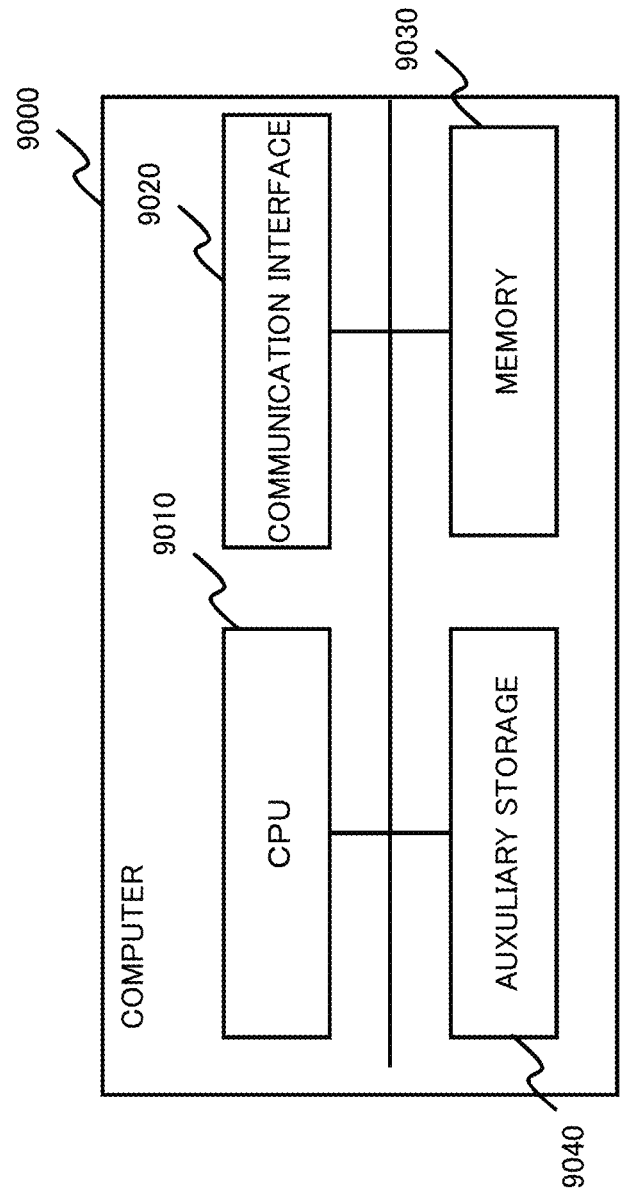
FIG. 9 is a diagram showing a configuration of a computer that functions as the object detection apparatus or the index generation apparatus according to each exemplary embodiments of the present invention.

The procedure described in the above exemplary embodiment can be realized by a program that causes a computer (9000 in FIG. 9) that functions as the prediction model generation apparatus or the index generation apparatus to realize the functions of these apparatus. Such a computer is exemplified by a configuration including a CPU (Central Processing Unit) 9010, a communication interface 9020, a memory 9030, and an auxiliary storage device 9040 as shown in FIG. 9. That is, the CPU 9010 in FIG. 9 may execute a pre-processing program, a machine learning program, and/or a post-processing program, and execute the update processing of the data stored in the auxiliary storage device 9040 or the like. Of course, an image processing processor called GPU (Graphics Processing Unit) may be used instead of the CPU 9010.

That is, each part (processing means and functions) of the prediction model generation apparatus and the index generation apparatus explained in the above-described exemplary embodiments executes the above-described processes by using a hardware mounted on a processor mounted on these apparatuses can be realized by a computer program.

Finally, preferred modes of the present invention are summarized.

<Mode 1>

Refer to the object detection apparatus according to the first aspect described above.

<Mode 2>

The object detection apparatus preferably according to mode 1, wherein the video data and the learning video data are a video data that is captured by a camera moving in a same pattern. That is, the object detection apparatus performs a specific object detection for the objects known.

<Mode 3>

The object detection apparatus preferably according to mode 2, further comprising: an error determination elimination part configured to confirm whether or not a determination result by the determination part is in error, based on a rule(s) that is configured by an appearance(s) of the object in the video data that is captured by the camera moving in the same pattern.

<Mode 4>

The object detection apparatus preferably according to mode 3, further comprising, an index generation part configured to generate index information indicating a timing when the object appears in the video data, based on a determination result by the determination part and the error determination elimination part.

<Mode 5>

The object detection apparatus preferably according to mode 4, further comprising: a position information acquisition part configured to acquire position information that identifies a captured position of the video data, wherein the index generation part is configured to generate the index information including the captured position of the object.

<Mode 6>

The object detection apparatus preferably according to any one of modes 1 to 5, further comprising: a pre-processing part configured to apply pre-processing that is the same processing as one processed to the learning image data extracted from the learning video data, to the image data extracted from the video data.

<Mode 7>

The object detection apparatus preferably according to any one of modes 1 to 6, wherein the prediction model is generated by assigning the learning teach label to each of N regions, by setting N regions extending over a longitudinal direction of the object appearing in the learning image data.

<Mode 8>

Refer to the prediction model generation apparatus according to the second aspect described above.

<Mode 9>

Refer to the object detection method according to the third aspect described above.

<Mode 10>

Refer to the program according to the fourth aspect described above.

Note that modes 8 to 10 are possible to be extended like the way in case of mode 1, which is extended to modes 2 to 7.

Each disclosure of the above-mentioned Patent Literatures that have been cited is incorporated herein in its entirety by reference. Modification and adjustment of each exemplary embodiment or each example are possible within the scope of the overall disclosure (including the claims) of the present invention and based on the basic technical concept of the present invention. Various combinations or selections (including partial deletion) of various disclosed elements (including each element in each claim, each element in each exemplary embodiment or each example, and each element in each drawing) are possible within the scope of the overall disclosure of the present invention. That is, the present invention naturally includes various variations and modifications that could be made by those skilled in the art according to the overall disclosure including the claims and the technical concept. With respect to numerical value range(s) described herein in particular, arbitrary numerical value(s) and a small range(s) included in the numerical value range should be construed to be specifically described even unless otherwise explicitly described.

REFERENCE SIGNS LIST

1 Video data
2 Pre-processing part
3 Image data
4 Learning analysis data
5 Learning teach label
6 Machine learning engine
7 Post-processing part
8 Index data
10 Object detection apparatus
11 Input part
12 Extraction part
13 Determination part
14, 62 Prediction model
21 Image generation part
22 Image detailing part
61 Prediction model generation part
71 Determination process part
72 Error determination elimination part
73 Index generation part
9000 Computer
9010 CPU
9020 Communication interface
9030 Memory
9040 Auxiliary storage

What is claimed is:

1. An object detection apparatus, comprising:
at least a processor; and
a memory in circuit communication with the processor;
wherein the processor is configured to execute program instructions stored in the memory to implement:
an input part configured to input video data;
an extraction part configured to extract image data from the video data; and
a determination part configured to determine whether or not the image data includes an object,
wherein the determination part is configured to:
set a plurality of regions in a learning image data such that the object appearing in the learning image data extracted from a learning video data captured in advance extends over at least the plurality of regions;
assign a learning teach label to each of the regions set; and
determine whether or not the image data includes the object by using a prediction model generated by utilizing the learning teach label assigned to each of the regions set,
wherein the video data and the learning video data are a video data that is captured by a camera moving in a same pattern, and
wherein the processor is further configured to execute program instructions stored in the memory to implement:
an error determination elimination part configured to confirm whether or not a determination result by the determination part is in error, using a rule(s) that is configured by an appearance(s) of the object in the video data that is captured by the camera moving in the same pattern; and
an index generation part configured to generate index information indicating a timing when the object appears in the video data, using a determination result by the determination part and the error determination elimination part.

2. The object detection apparatus according to claim 1, wherein the processor is further configured to execute program instructions stored in the memory to implement:
a position information acquisition part configured to acquire position information that identifies a captured position of the video data,
wherein the index generation part is configured to generate the index information including the captured position of the object.

3. The object detection apparatus according to claim 1, wherein the processor is further configured to execute program instructions stored in the memory to implement:
a pre-processing part configured to apply pre-processing that is the same processing as one processed to the learning image data extracted from the learning video data, to the image data extracted from the video data.

4. The object detection apparatus according to claim 1, wherein the prediction model is generated by assigning the learning teach label to each of N regions, by setting N regions extending over a longitudinal direction of the object appearing in the learning image data.

5. An object detection method performed by a computer comprising an input part configured to input the video data, the method comprising:
extracting of image data from the video data;
determining whether or not the image data includes an object by setting a plurality of regions in the learning image data such that the object appearing in the learning image data extracted from learning video data captured in advance extends over at least the plurality of regions, and by assigning a learning teach label to each of the regions set, wherein the video data and the learning video data are a video data that is captured by a camera moving in a same pattern;

confirming whether or not a determination result by the determining is in error, using a rule(s) that is configured by an appearance(s) of the object in the video data that is captured by the camera moving in the same pattern; and generating index information indicating a timing when the object appears in the video data, using a determination result by the determining and the confirming.

6. The object detection method according to claim 5, the method further comprising:

acquiring a position information configured to acquire position information that identifies a captured position of the video data, wherein the generating the index is further configured to generate the index information including the captured position of the object.

7. The object detection method according to claim 5, the method further comprising:

applying pre-processing that is the same processing as one processed to the learning image data extracted from the learning video data, to the image data extracted from the video data.

\* \* \* \* \*